(12) United States Patent
Masuda et al.

(10) Patent No.: US 9,209,698 B2
(45) Date of Patent: Dec. 8, 2015

(54) ELECTRIC POWER CONVERSION DEVICE

(71) Applicant: Panasonic Intellectual Property Management Co., Ltd., Osaka (JP)

(72) Inventors: Takuya Masuda, Shizuoka (JP); Keisuke Muto, Shizuoka (JP); Maiya Sanuki, Sanuki (JP); Masakazu Adachi, Osaka (JP); Susumu Kobayashi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/406,730

(22) PCT Filed: May 23, 2013

(86) PCT No.: PCT/JP2013/003294
§ 371 (c)(1),
(2) Date: Dec. 9, 2014

(87) PCT Pub. No.: WO2013/186996
PCT Pub. Date: Dec. 19, 2013

(65) Prior Publication Data
US 2015/0162841 A1 Jun. 11, 2015

(30) Foreign Application Priority Data
Jun. 14, 2012 (JP) .................................. 2012-135098

(51) Int. Cl.
*H02M 3/335* (2006.01)
*H02M 3/337* (2006.01)
*H02M 1/00* (2007.01)

(52) U.S. Cl.
CPC ........ *H02M 3/33507* (2013.01); *H02M 3/3376* (2013.01); *H02M 3/33584* (2013.01); *H02M 2001/0074* (2013.01); *H02M 2001/0077* (2013.01); *H02M 2001/0093* (2013.01)

(58) Field of Classification Search
CPC ... H02M 3/28; H02M 3/3376; H02M 5/4585; H02M 3/1584; H02J 1/102
USPC .......... 363/15, 17, 34, 37, 65; 307/48, 66, 46
See application file for complete search history.

(56) References Cited

U.S. PATENT DOCUMENTS 4,719,550 A * 1/1988 Powell et al. .................... 363/37
5,241,217 A * 8/1993 Severinsky ...................... 307/64
(Continued)

FOREIGN PATENT DOCUMENTS

EP          1020973 A2   7/2000
JP       2001-211645 A   8/2001
(Continued)

OTHER PUBLICATIONS

International Search Report issued in PCT/JP2013/003294, dated Jul. 2, 2013, with English translation.
(Continued)

*Primary Examiner* — Adolf Berhane
(74) *Attorney, Agent, or Firm* — McDermott Will & Emery LLP (57) ABSTRACT

Electric power conversion device has first and second operation modes. First operation mode is of converting DC power from a first terminal into DC power having a desired voltage to be output to second terminal. Second operation mode is of converting DC power from the second terminal into DC power having a desired voltage to be output to first terminal. Switching section is configured to, in first operation mode, be turned on to cause short-circuiting between both ends of capacitor of rectifying circuit, and, in second operation mode, be turned off. First conversion part is configured to, in first operation mode, supply DC power-from first terminal, from first winding to second conversion part through a conversion circuit, and, in second operation mode, output to first terminal a voltage obtained by adding an output voltage of rectifying circuit to an output voltage of conversion circuit.

12 Claims, 5 Drawing Sheets

(56) References Cited

U.S. PATENT DOCUMENTS

| | | | |
|---|---|---|---|
| 2003/0002304 A1* | 1/2003 | Zhu et al. | 363/56.02 |
| 2003/0228503 A1* | 12/2003 | Georgii | 429/13 |
| 2005/0254272 A1 | 11/2005 | Vinciarelli | |
| 2007/0139975 A1 | 6/2007 | Yamauchi et al. | |
| 2009/0034299 A1* | 2/2009 | Lev | 363/17 |
| 2010/0128498 A1* | 5/2010 | Nymand | 363/17 |
| 2010/0142228 A1 | 6/2010 | Yamauchi et al. | |
| 2010/0164428 A1* | 7/2010 | Xu et al. | 318/767 |
| 2011/0210613 A1* | 9/2011 | O'Brien et al. | 307/82 |
| 2012/0098331 A1* | 4/2012 | Krause | 307/9.1 |
| 2012/0112702 A1* | 5/2012 | Steigerwald et al. | 320/137 |
| 2012/0161525 A1* | 6/2012 | Hong et al. | 307/73 |
| 2013/0044519 A1 | 2/2013 | Teraura et al. | |
| 2013/0070495 A1* | 3/2013 | Jonsson et al. | 363/84 |

FOREIGN PATENT DOCUMENTS

| | | | |
|---|---|---|---|
| JP | 2007-174784 A | 7/2007 |
| JP | 2011-050227 A | 3/2011 |
| JP | 2011-234541 A | 11/2011 |

OTHER PUBLICATIONS

Kheraluwala M.H.: "Performance Characterization of a High-Power Dual Active Bridge DC-to-DC Converter". IEEE Transactions on Industry Applications. IEEE Service Center. Piscataway, NJ. US. vol. 28, No. 6. Nov. 1, 1992. pp. 1294-1301. XP000331298. ISSN: 0093-9994. DOI: 10.11 09/28.175280.

Extended European Search Report issued in Application No. 13804362.5 dated Jul. 22, 2015.

* cited by examiner

ELECTRIC POWER CONVERSION DEVICE

RELATED APPLICATIONS

This application is the U.S. National Phase under 35 U.S.C. §371 of International Application No. PCT/JP2013/003294, filed on May 23, 2013, which in turn claims the benefit of Japanese Application No. 2012-135098, filed on Jun. 14, 2012, the disclosures of which Applications are incorporated by reference herein.

TECHNICAL FIELD

The invention relates to an electric power conversion device, which is configured to bidirectionally convert DC power, using a transformer.

BACKGROUND ART

Conventionally, there has been an electric power conversion device, which is configured to bidirectionally convert DC power between a primary side and a secondary side thereof, to be used for charge and discharge of a storage battery, or the like. For example, in a state where the primary side is connected with a DC power supply and the secondary side is connected with the storage battery, the electric power conversion device is configured to convert DC power received from the DC power supply into desired DC power to be output to the secondary side, and accordingly, it is possible to allow the charge of the storage battery. On the other hand, in a state where the primary side is connected with a load and the secondary side is connected with the storage battery, the electric power conversion device is configured to convert DC power received from the storage battery into desired DC power to be output to the primary side, and accordingly, it is possible to allow the discharge of the storage battery.

As this type of electric power conversion device, there has been known a device (a bidirectional DC/DC converter), which has a function of mutually converting DC power between a first DC power supply or a first load, and a second load or a second DC power supply (see JP 2011-234541 A, hereinafter referred to as document 1). The electric power conversion device described in the document 1 includes: a primary side circuit including the first DC power supply or the first load; and a secondary side circuit including the second load or the second DC power supply; and a transformer that is between the primary side circuit and the secondary side circuit.

The electric power conversion device described in the document 1 further includes bridge circuits that are respectively disposed in the primary side circuit and the secondary side circuit, each of which is constituted by four semiconductor switches. The electric power conversion device is configured to, by synchronizing operations of semiconductor switches in the bridge circuits, supply electric power transformed with a transformation ratio of the transformer, from the primary side circuit to the secondary side circuit, or supply electric power transformed with the transformation ratio of the transformer, from the secondary side circuit to the primary side circuit.

However, the electric power conversion device, which is configured to bidirectionally convert DC power with the transformer, cannot boost the DC power bidirectionally, because a direction of boosting the DC power is fixedly set, depending on the transformation ratio (a turn ratio) of the transformer. That is, when the electric power conversion device is configured to boost DC power, as the electric power conversion, toward the secondary side from the primary side, DC power is stepped down in a case where the electric power conversion is performed in a reverse direction (toward the primary side from the secondary side). For this reason, when the electric power conversion device is used for charge and discharge of the storage battery for example, it is impossible to perform such use as boosting, upon charge of the storage battery, DC power received from the DC power supply to allow charge of the storage battery, and, upon discharge of the storage battery, boosting DC power received from the storage battery to be supplied to the load.

SUMMARY OF THE INVENTION

The present invention has been made in the light of the above-mentioned problem, and it is an object thereof to provide an electric power conversion device, which can bidirectionally boost electric power while using a transformer.

An electric power conversion device according to a first aspect of the present invention includes a transformer, a first conversion part and a second conversion part. The transformer is disposed between a first terminal and a second terminal. The first conversion part is disposed between the first terminal and a first winding of the transformer. The second conversion part is disposed between the second terminal and a second winding of the transformer. The electric power conversion device has a first operation mode and a second operation mode. The first operation mode is of converting DC power received from the first terminal into DC power having a desired voltage to be output to the second terminal. The second operation mode is of converting DC power received from the second terminal into DC power having a desired voltage to be output to the first terminal. The first conversion part includes a first conversion circuit, at least one first rectifying circuit, and at least one first switching section. The first conversion circuit is configured to bidirectionally convert power between the first terminal and the first winding. The at least one first rectifying circuit is configured to output DC power by receiving power supply from the first winding. The at least one first switching section is configured to switch a connection state of the first rectifying circuit with respect to the first terminal, based on the first operation mode or the second operation mode. By the first switching section switching the connection state of the first rectifying circuit, the first conversion part is configured to: in the first operation mode, supply the DC power received from the first terminal into the second conversion part through the first conversion circuit and the transformer; and in the second operation mode, output to the first terminal a voltage obtained by adding an output voltage of the first rectifying circuit to an output voltage of the first conversion circuit.

According to this first aspect, the electric power conversion device is configured to switch the connection state of the first rectifying circuit with respect to the first terminal, based on the first operation mode or the second operation mode, through the first switching section. Accordingly, the first conversion part is configured to: in the first operation mode, supply the DC power received from the first terminal into the second conversion part through the first conversion circuit and the transformer; and, in the second operation mode, output to the first terminal the voltage obtained by adding the output voltage of the first rectifying circuit to the output voltage of the first conversion circuit. Therefore, it is possible to bidirectionally boost electric power while using the transformer.

As an electric power conversion device according to a second aspect of the present invention, in the first aspect, the transformer includes, as the first winding, a first main winding that is connected with the first conversion circuit, and a first auxiliary winding that is connected with the first rectifying circuit.

As an electric power conversion device according to a third aspect of the present invention, in the second aspect, the first conversion circuit includes a first rectifier that is connected with the first main winding, and a first capacitor that is connected with a DC output of the first rectifier. The first rectifying circuit includes a second rectifier that is connected with the first auxiliary winding, and a second capacitor that is connected with a DC output of the second rectifier. The first capacitor is connected in series with the second capacitor, and a set of the first and second capacitors is connected to the first terminal. The first switching section is a switching element that is connected between both ends of the second capacitor. The first switching section is configured to, in the first operation mode, be turned on to cause short-circuiting between the both ends of the second capacitor, and, in the second operation mode, be turned off.

As an electric power conversion device according to a fourth aspect of the present invention, in the third aspect, the first rectifying circuit further includes a first switch that is between the second capacitor and the first switching section. The first rectifying circuit is configured to, in the first operation mode, turn off the first switch, and in the second operation mode, turn on the first switch.

As an electric power conversion device according to a fifth aspect of the present invention, in the fourth aspect, the first and second capacitors have capacitances, depending on a turn ratio of the first main winding and the first auxiliary winding, so that electric charge amounts in the first and second capacitors are equal to each other in the second operation mode.

As an electric power conversion device according to a sixth aspect of the present invention, in any one of the first to fifth aspects, the first rectifying circuit and the first conversion circuit are connected with the first terminal so that, in the second operation mode, a ripple generated in the output voltage of the first rectifying circuit has an inverse phase with respect to a phase of a ripple generated in the output voltage of the first conversion circuit.

As an electric power conversion device according to a seventh aspect of the present invention, in any one of the first to sixth aspects, the at least one first rectifying circuit of the first conversion part includes a plurality of first rectifying circuits, and the at least one first switching section includes a plurality of first switching sections. By the plurality of first switching sections respectively switching connection states of the plurality of first rectifying circuits with respect to the first terminal, the first conversion part is configured to, in the second operation mode, output to the first terminal a voltage obtained by adding an output voltage of at least one of the plurality of first rectifying circuits to the output voltage of the first conversion circuit.

As an electric power conversion device according to an eighth aspect of the present invention, in any one of the first to seventh aspects, the second conversion part includes a second conversion circuit, at least one second rectifying circuit, and at least one second switching section. The second conversion circuit is configured to bidirectionally convert power between the second terminal and the second winding. The at least one second rectifying circuit is configured to output DC power by receiving power supply from the second winding. The at least one second switching section is configured to switch a connection state of the second rectifying circuit with respect to the second terminal, based on the first operation mode or the second operation mode. By the second switching section switching the connection state of the second rectifying circuit, the second conversion part is configured to: in the second operation mode, supply the DC power received from the second terminal into the first conversion part through the second conversion circuit and the transformer; and in the first operation mode, output to the second terminal a voltage obtained by adding an output voltage of the second rectifying circuit to an output voltage of the second conversion circuit.

As an electric power conversion device according to a ninth aspect of the present invention, in the eighth aspect, the transformer includes, as the second winding, a second main winding that is connected with the second conversion circuit, and a second auxiliary winding that is connected with the second rectifying circuit.

As an electric power conversion device according to a tenth aspect of the present invention, in the ninth aspect, the second conversion circuit includes a third rectifier that is connected with the second main winding, and a third capacitor that is connected with a DC output of the third rectifier. The second rectifying circuit includes a fourth rectifier that is connected with the second auxiliary winding, and a fourth capacitor that is connected with a DC output of the fourth rectifier. The third capacitor is connected in series with the fourth capacitor, and a set of the third and fourth capacitors is connected to the second terminal. The second switching section is a switching element that is connected between both ends of the fourth capacitor. The second switching section is configured to, in the second operation mode, be turned on to cause short-circuiting between the both ends of the fourth capacitor, and, in the first operation mode, be turned off.

As an electric power conversion device according to an eleventh aspect of the present invention, in the tenth aspect, the second rectifying circuit further includes a second switch that is between the fourth capacitor and the second switching section. The second rectifying circuit is configured to, in the second operation mode, turn off the second switch, and in the first operation mode, turn on the second switch.

As an electric power conversion device according to a twelfth aspect of the present invention, in the eleventh aspect, the third and fourth capacitors have capacitances, depending on a turn ratio of the second main winding and the second auxiliary winding, so that electric charge amounts in the third and fourth capacitors are equal to each other in the first operation mode.

As an electric power conversion device according to a thirteenth aspect of the present invention, in any one of the eighth to twelfth aspects, the second rectifying circuit and the second conversion circuit are connected with the second terminal so that, in the first operation mode, a ripple generated in the output voltage of the second rectifying circuit has an inverse phase with respect to a phase of a ripple generated in the output voltage of the second conversion circuit.

As an electric power conversion device according to a fourteenth aspect of the present invention, in any one of the eighth to thirteenth aspects, the at least one second rectifying circuit of the second conversion part includes a plurality of second rectifying circuits, and the at least one second switching section includes a plurality of second switching sections. By the plurality of second switching sections respectively switching connection states of the plurality of second rectifying circuits with respect to the second terminal, the second conversion part is configured to, in the first operation mode, output to the second terminal a voltage obtained by adding an output voltage of at least one of the plurality of second rectifying circuits to the output voltage of the second conversion circuit.

BRIEF DESCRIPTION OF THE DRAWINGS

FIGS. 2A and 2B are explanatory drawings for operation of the electric power conversion device according to the First Embodiment.

EMBODIMENTS FOR CARRYING OUT THE INVENTION

First Embodiment

In the present embodiment, as an example, described is an electric power conversion device, which is used for charge and discharge of a storage battery (a battery for traveling) equipped in a vehicle of generating driving force in traveling with electrical energy, such as an electric vehicle (EV) or a plug-in hybrid electric vehicle (PHEV). Note that, as long as the vehicle is an electric vehicle of consuming, for traveling, the electrical energy stored in the storage battery, the vehicle is not limited to a four wheel vehicle. The vehicle may be an electric two wheel vehicle or the like.

An electric power conversion device described below is installed in a house, and is used for supplying electric power into a vehicle (not shown) to allow charge of a storage battery (not shown) in the vehicle via a DC supply bus (not shown) installed in the house, and supplying electric power into the DC supply bus by discharge of the storage battery in the vehicle. The DC supply bus mentioned here is connected with DC power supplies, such as a solar power generator, a fuel cell and a stationary type of power storage device. DC powers from those DC power supplies are supplied into a power conditioner or the like. Note that, in the present embodiment, described is a case where the electric power conversion device is used in a detached house, but it is not limited to such a case. The electric power conversion device may be used in a multiple dwelling house or an office.

Figure 1:
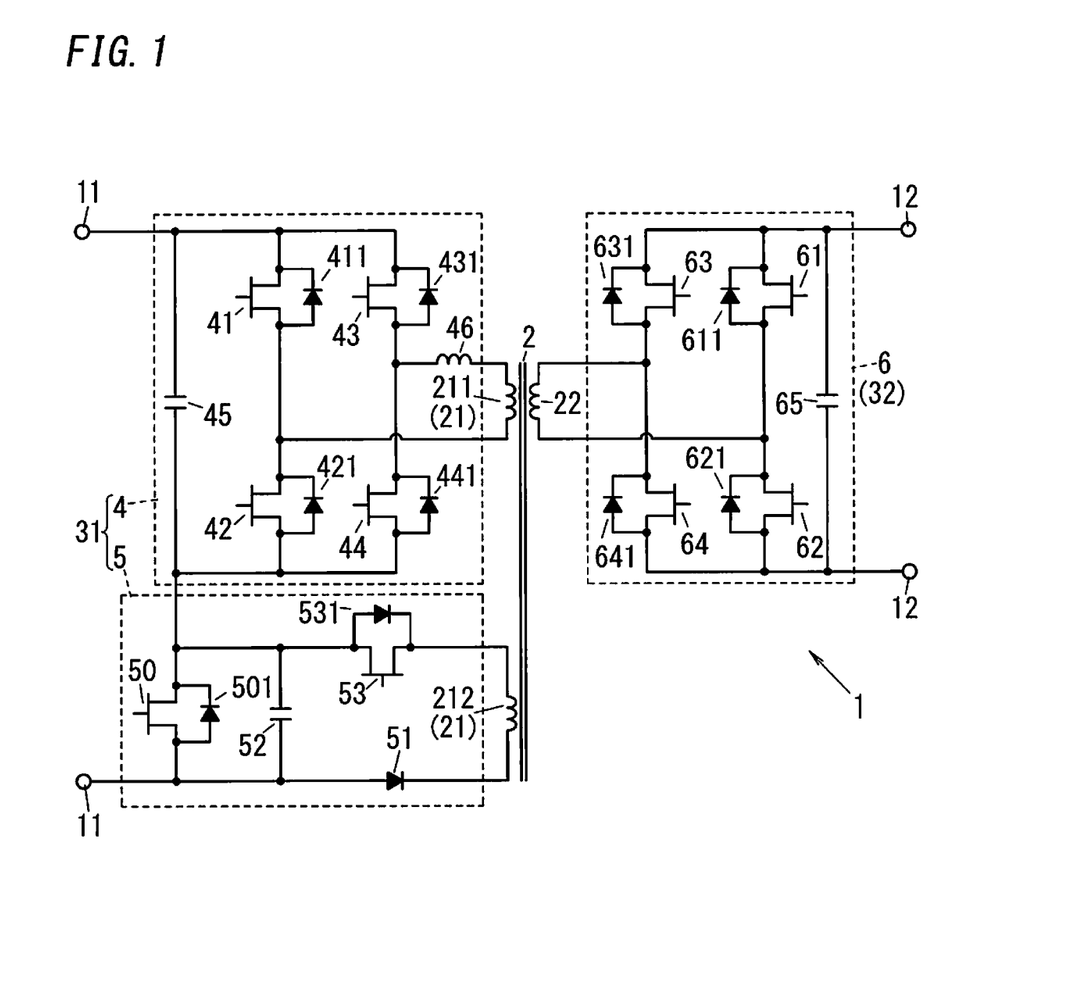
FIG. 1 is a circuit diagram illustrating a configuration of an electric power conversion device according to First Embodiment.

As shown in FIG. 1, an electric power conversion device 1 of the present embodiment includes a pair of first terminals 11, a pair of second terminals 12, and a transformer 2 that is disposed between the pair of first terminals 11 and the pair of second terminals 12. The electric power conversion device 1 further includes: a first conversion part 31 that is disposed between the first terminals 11 and the transformer 2; a second conversion part 32 that is disposed between the second terminals 12 and the transformer 2; and a control unit (not shown) that is configured to integrally control operation of the above-mentioned parts. The control unit is configured as a microcomputer for example.

The electric power conversion device 1 has a function of bidirectionally converting DC power between the first terminals 11 and the second terminals 12, and is configured to boost (or step down) electric power, depending on a turn ratio (i.e., a transformation ratio of the transformer 2) of a first winding 21 and a second winding 22 of the transformer 2. The electric power conversion device 1 is configured to control operations of the first and second conversion parts 31 and 32 with the control unit to switch between two operation modes in which directions of converting electric power between the first terminals 11 and the second terminals 12 are different from each other. That is, the electric power conversion device 1 has a first operation mode and a second operation mode, and the first operation mode is of converting DC power received from the first terminals 11 into DC power having a desired voltage to be output to the second terminals 12, and the second operation mode is of converting DC power received from the second terminals 12 into DC power having a desired voltage to be output to the first terminals 11. Note that, the electric power conversion device 1 also can step down electric power with a desired transformation ratio, by allowing switching operation of the first and second conversion parts 31 and 32 to perform PWM (Pulse Width Modulation) control or PPM (Pulse Phase Modulation) control.

Hereinafter, as an example, described is a case where the first terminals 11 are connected with a vehicle side (a storage battery), and the second terminals 12 are connected with a house side (a DC supply bus), and the electric power conversion device 1 is configured to operate in the first operation mode during discharge of the storage battery, and in the second operation mode during charge of the storage battery.

The transformer 2 is provided on a primary side thereof (a side of the first terminals 11) with, as the first winding 21, two windings: a (first) main winding 211 and a (first) auxiliary winding 212. The transformer 2 is provided on a secondary side thereof (a side of the second terminals 12) with the single second winding 22. Hereinafter, the number of turns of the main winding 211 is set as "n1", and the number of turns of the auxiliary winding 212 is set as "n2", and the number of turns of the second winding 22 is set as "m". The turn ratio of the transformer 2 is set so as to satisfy at least a relationship of "m>n1".

The first conversion part 31 is disposed between the first terminals 11 and the first winding 21. The first conversion part 31 includes: a (first) conversion circuit 4 that is connected with the main winding 211; a (first) rectifying circuit 5 that is connected with the auxiliary winding 212; and a (first) switching section 50 that is configured to switch a connection state of the rectifying circuit 5 with respect to the first terminals 11. The switching section 50 in the example of FIG. 1 is provided in the rectifying circuit 5. However, the switching section 50 may be provided separately from the rectifying circuit 5.

The conversion circuit 4 is configured to bidirectionally convert electric power between the first terminals 11 and the first winding 21 (main winding 211). That is, the conversion circuit 4 is configured to, in the first operation mode, convert DC power received from the first terminals 11, and output the converted power to the first winding 21 (main winding 211) to supply power into the second winding 22. In the second operation mode, the conversion circuit 4 is configured to receive electric power from the first winding 21 (main winding 211), and output DC power to the first terminals 11. In other words, the conversion circuit 4, in the first operation mode, functions as an inverter circuit of converting DC into AC, and, in the second mode, functions as a rectifying circuit of converting AC into DC.

Specifically, as shown in FIG. 1, the conversion circuit 4 includes a (first) capacitor 45, four switching elements 41 to 44 that are connected between both ends of the capacitor 45, and an inductor 46. Here, between both ends of the capacitor 45, a series circuit of the switching elements 41 and 42 is connected in parallel with a series circuit of the switching elements 43 and 44. The conversion circuit 4 is configured as a full-bridge type inverter circuit. A connecting point of the switching elements 41 and 42, and a connecting point of the switching elements 43 and 44 are connected with the main winding 211 via the inductor 46.

The switching elements 41, 42, 43 and 44 mentioned here are MOSFETs (Metal Oxide Semiconductor Field Effect Transistors) in which on/off switching thereof can be controlled by the control unit. Diodes 411, 421, 431 and 441 are respectively connected in reverse parallel between drains and sources of the switching elements 41, 42, 43 and 44. The diodes 411, 421, 431 and 441 may be parasitic diodes for the MOSFETs. The switching elements 41, 42, 43 and 44 may be semiconductor switches other than MOSFETs.

The conversion circuit 4, in the first operation mode, is configured to convert a DC voltage across the capacitor 45 into an AC voltage to apply to the first winding 21 (main winding 211), by switching operation such that a set of the switching elements 41 and 44, and a set of the switching elements 42 and 43 are alternately turned on. On the other hand, the conversion circuit 4, in the second operation mode, is configured to turn off all of the switching elements 41 to 44, and receive power supply from the first winding 21 (main winding 211) and allow charge of the capacitor 45, with, as a first rectifier, a diode bridge of the diodes 411, 421, 431 and 441. At this time, full-waves of AC power from the first winding 21 are rectified by the diode bridge (first rectifier) of the diodes 411, 421, 431 and 441, and are smoothed by the capacitor 45. In short, the control unit is configured to control the switching elements 41 to 44 so as to alternately turn on the set of the switching elements 41 and 44 and the set of the switching elements 42 and 43 in the first operation mode, and maintain off-states of the switching elements 41 to 44 in the second operation mode.

The rectifying circuit 5, in the second operation mode, is configured to receive power supply from the first winding 21 (auxiliary winding 212), and output DC power to the first terminals 11. In other words, the rectifying circuit 5, in the second operation mode, functions so as to convert AC into DC.

Specifically, as shown in FIG. 1, the rectifying circuit 5 includes a diode 51, a (second) capacitor 52 and a switching element 53 that are between both ends of the auxiliary winding 212, and are connected in series. Here, one end of the auxiliary winding 212 is connected with a cathode of the diode 51, and the other end of the auxiliary winding 212 is connected with one end of the switching element 53, and both ends of the capacitor 52 are respectively connected with an anode of the diode 51 and the other end of the switching element 53. The switching element 53 mentioned here is a MOSFET in which on/off switching thereof can be controlled by the control unit. A diode 531 is connected in reverse parallel between a drain and a source of the switching element 53. The diode 531 may be a parasitic diode for the MOSFET. The switching element 53 may be a semiconductor switch other than a MOSFET.

The rectifying circuit 5, in the first operation mode, is configured to turn off the switching element 53 to be electrically separated from the first winding 21 (auxiliary winding 212), and in this case, it can be considered that the auxiliary winding 212 is in an open state. On the other hand, the rectifying circuit 5, in the second operation mode, is configured to turn on the switching element 53, and in this case, the diode 51 functions as a second rectifier, and accordingly, the rectifying circuit 5 receives power supply from the first winding 21 (auxiliary winding 212) to allow charge of the capacitor 52. At this time, half-waves of AC power from the first winding 21 are rectified by the diode 51 (second rectifier), and are smoothed by the capacitor 52, as a smoothing capacitor. In short, the control unit is configured to control the switching element 53 so as to maintain an off-state of the switching element 53 in the first operation mode, and maintain an on-state of the switching element 53 in the second operation mode.

Here, in the first conversion part 31, the (first) capacitor 45 of the conversion circuit 4 is connected in series with the (second) capacitor 52 of the rectifying circuit 5, and a set of the capacitor 45 and the capacitor 52 is connected to the first terminals 11. In the example of FIG. 1, the capacitor 45 is connected on a high potential side, and the capacitor 52 is connected on a low potential side.

The switching section 50 is a switching element which is connected in series with the (first) capacitor 45 of the conversion circuit 4, and connected in parallel with the (second) capacitor 52 of the rectifying circuit 5. The switching section 50 mentioned here is a MOSFET in which on/off switching thereof can be controlled by the control unit, and a diode 501 is connected in reverse parallel between a drain and a source of the switching section 50. The diode 501 may be a parasitic diode for the MOSFET. The switching section 50 may be a semiconductor switch other than a MOSFET.

In an on-state of the switching section 50, short-circuiting between both ends of the capacitor 52 is caused by the switching section 50, and the capacitor 52 of the rectifying circuit 5 is bypassed between the first terminals 11, and accordingly, the capacitor 45 of the conversion circuit 4 is in a connection state with respect to the first terminals 11. In an off-state of the switching section 50, the capacitor 52 of the rectifying circuit 5 is not bypassed, and accordingly, the capacitor 45 of the conversion circuit 4 and the capacitor 52 of the rectifying circuit 5 are in a connection state with respect to the first terminals 11. Operation of the switching section 50 will be described later in detail.

The second conversion part 32 is disposed between the second terminals 12 and the second winding 22, and includes a (second) conversion circuit 6 that is configured to bidirectionally convert electric power between the second terminals 12 and the second winding 22. That is, the conversion circuit 6 is configured to, in the first operation mode, receive power supply from the second winding 22, and output DC power to the second terminals 12. In the second operation mode, the conversion circuit 6 is configured to convert DC power from the second terminals 12, and output the converted power to the second winding 22 to supply electric power to the first winding 21. In other words, the conversion circuit 6, in the first operation mode, functions as a rectifying circuit of converting AC into DC, and, in the second mode, functions as an inverter circuit of converting DC into AC.

Specifically, the conversion circuit 6 includes a capacitor 65 and four switching elements 61 to 64 that are connected between both ends of the capacitor 65. Here, between both ends of the capacitor 65, a series circuit of the switching elements 61 and 62 is connected in parallel with a series circuit of the switching elements 63 and 64. The conversion circuit 6 is configured as a full-bridge type inverter circuit, similarly to the (first) conversion circuit 4 of the first conversion part 31. A connecting point of the switching elements 61 and 62, and a connecting point of the switching elements 63 and 64 are connected with the second winding 22.

The switching elements 61, 62, 63 and 64 mentioned here are MOSFETs in which on/off switching thereof can be controlled by the control unit. Diodes 611, 621, 631 and 641 are respectively connected in reverse parallel between drains and sources of the switching elements 61, 62, 63 and 64. The diodes 611, 621, 631 and 641 may be parasitic diodes for the MOSFETs. The switching elements 61, 62, 63 and 64 may be semiconductor switches other than MOSFETs. That is, the (first) conversion circuit 4 of the first conversion part 31, and the (second) conversion circuit 6 of the second conversion part 32 are configured almost symmetrically around the transformer 2.

The conversion circuit 6, in the first operation mode, is configured to turn off all of the switching elements 61 to 64, and receive power supply from the second winding 22 and allow charge of the capacitor 65, with, as a third rectifier, a diode bridge of the diodes 611, 621, 631 and 641. At this time, full-waves of AC power from the second winding 22 are rectified by the diode bridge (third rectifier) of the diodes 611, 621, 631 and 641, and are smoothed by the capacitor 65. On the other hand, the conversion circuit 6, in the second operation mode, is configured to convert a DC voltage across the capacitor 65 into an AC voltage to apply to the second winding 22, by switching operation such that a set of the switching elements 61 and 64, and a set of the switching elements 62 and 63 are alternately turned on. In short, the control unit is configured to maintain off-states of the switching elements 61 to 64 in the first operation mode, and control the switching elements 61 to 64 so as to alternately turn on the set of the switching elements 61 and 64 and the set of the switching elements 62 and 63 in the second operation mode.

Here, in the second conversion part 32, the capacitor 65 of the conversion circuit 6 is connected with the second terminals 12. Therefore, as described above, when the switching section 50 is in the on-state and the capacitor 45 of the conversion circuit 4 is in the connection state with respect to the first terminals 11, the electric power conversion device 1 is configured to bidirectionally convert DC power between the first terminals 11 and the second terminals 12, with the conversion circuits 4 and 6. That is, if the switching section 50 is held in the on-state, the electric power conversion device 1, in the first operation mode, is configured to convert DC power received from the first terminals 11 into DC power having a desired voltage, with the conversion circuit 4, the transformer 2 and the conversion circuit 6, and output the converted DC power via the second terminals 12. In the second operation mode, the electric power conversion device 1 is configured to convert DC power received from the second terminals 12 into DC power having a desired voltage, with the conversion circuit 6, the transformer 2 and the conversion circuit 4, and output the converted DC power via the first terminals 11.

In this case, a transformation ratio between the first terminals 11 and the second terminals 12 is fixedly determined, depending on a turn ratio of the main winding 211 of the first winding 21 and the second winding 22 in the transformer 2. In other words, a ratio of a voltage V1 across the first terminals 11 and a voltage V2 across the second terminals 12 is determined, depending on a ratio of the number of turns "n1" of the main winding 211 connected with the conversion circuit 4 and the number of turns "m" of the second winding 22 connected with the conversion circuit 6. The voltage V1 across the first terminals 11 mentioned here is a voltage applied between the first terminals 11, and the voltage V2 across the second terminals 12 mentioned here is a voltage applied between the second terminals 12.

For this reason, in the electric power conversion device 1, when the switching section 50 is held in the on-state, the turn ratio satisfies the relationship of "m>n1" as described above, and accordingly, regarding the transformation ratio, a relationship of "V2>V1" is satisfied. In other words, the electric power conversion device 1 is configured to perform boosting of electric power in the electric power conversion (the first operation mode) toward the second terminals 12 from the first terminals 11, and step-down of electric power in the electric power conversion (the second operation mode) toward the first terminals 11 from the second terminals 12.

Here, in the electric power conversion device 1 of the present embodiment, as described below, the switching section 50 is further configured to switch a connection state of the rectifying circuit 5 with respect to the first terminals 11, based on the first operation mode or the second operation mode, and therefore, it is possible to perform bidirectionally boosting of electric power.

That is, the switching section 50 is configured to, in the first operation mode, be turned on to cause short-circuiting between both ends of the capacitor 52 of the rectifying circuit 5 and be turned off in the second operation mode, so as to switch the connection state of the rectifying circuit 5 with respect to the first terminals 11, based on the first operation mode or the second operation mode. Accordingly, the first conversion part 31 is configured to, in the first operation mode, supply DC power received from the first terminals 11 to the second conversion part 32 through the conversion circuit 4 and the transformer 2, and in the second operation mode, output to the first terminals 11 a voltage obtained by adding an output voltage of the rectifying circuit 5 to an output voltage of the conversion circuit 4.

Hereinafter, operation of the electric power conversion device 1 of the present embodiment will be described with reference to FIGS. 2A and 2B. Note that, arrows A and B in FIGS. 2A and 2B denote directions toward which the electric power conversion is performed.

Figure 2A:
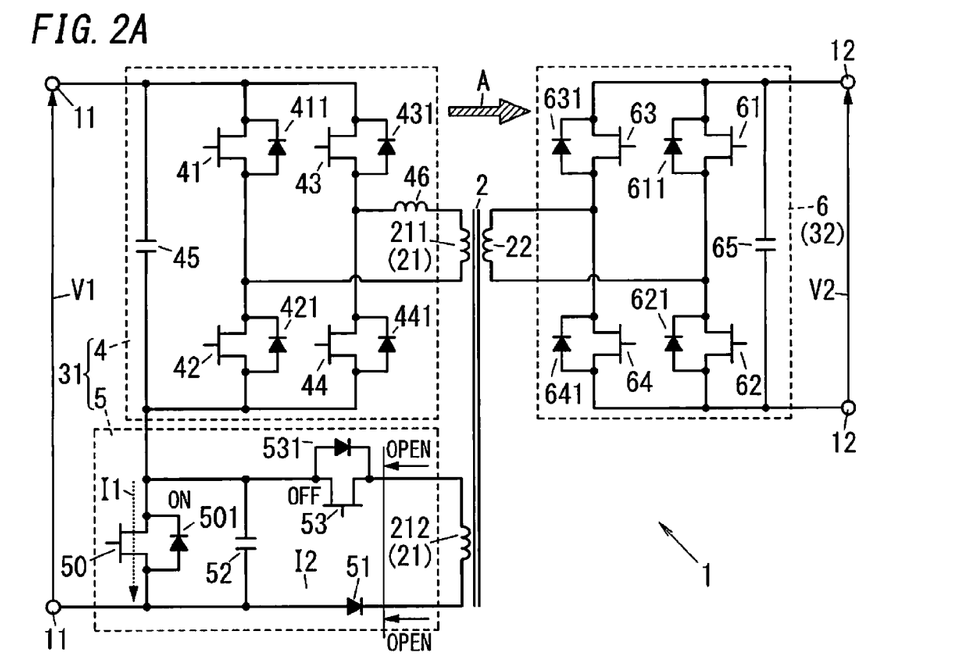
FIG. 2A is an explanatory drawing in a first operation mode.

As shown in FIG. 2A, in the electric power conversion device 1, the capacitor 45 of the conversion circuit 4 is in a connection state between the first terminals 11 due to the on-state of the switching section 50, in the first operation mode of performing the electric power conversion toward the second terminals 12 from the first terminals 11. At this time, an input current I1 from the first terminals 11 flows through the switching section 50 without flowing through the capacitor 52 of the rectifying circuit 5. Therefore, when an ON resistance value of the switching section 50 is negligibly small, a voltage having a magnitude equal to the voltage V1 across the first terminals 11 is applied across the capacitor 45 of the conversion circuit 4. In the state of FIG. 2A, the rectifying circuit 5 is in a state of being electrically separated from the first winding 21 (auxiliary winding 212) due to the off-state of the switching element 53, and accordingly, the auxiliary winding 212 of the first winding 21 is in the open state.

Therefore, in the first operation mode, the electric power conversion device 1 converts DC power received from the first terminals 11, with the transformation ratio that is determined depending on the turn ratio (n1:m) of the main winding 211 of the first winding 21 and the second winding 22, and output the converted power to the second terminals 12. Here, because the turn ratio satisfies the relationship of "m>n1", the electric power conversion device 1 boosts the voltage V1 across the first terminals 11, and outputs a boosted voltage, as the voltage V2 (=V1×m/n1) across the second terminals 12 (V2>V1).

Figure 2B:
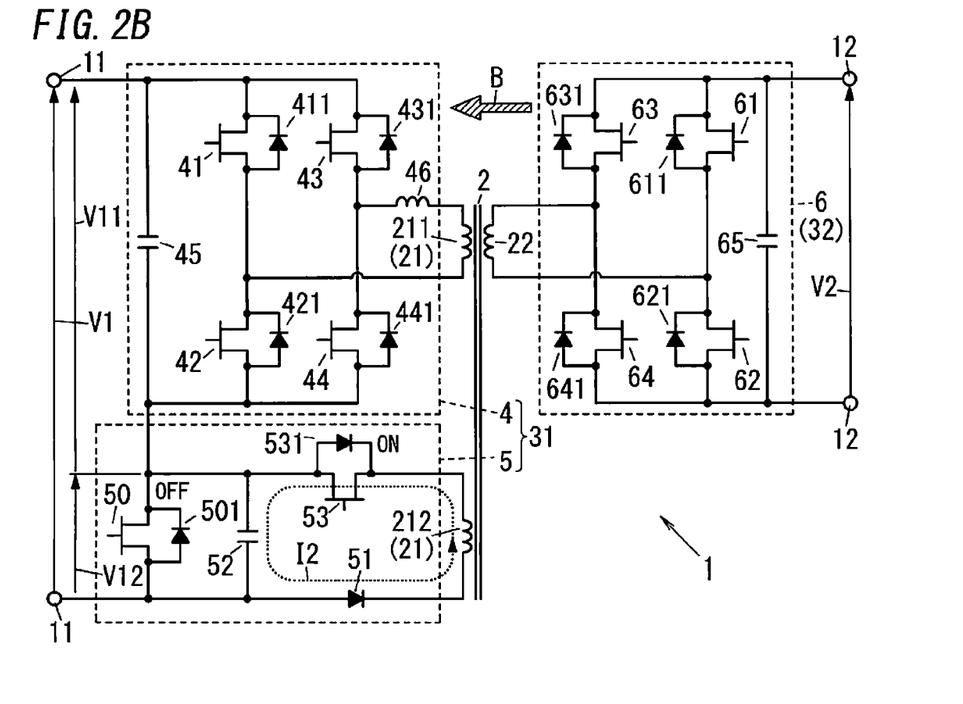
FIG. 2B is an explanatory drawing in a second operation mode.

On the other hand, as shown in FIG. 2B, in the electric power conversion device 1, the switching section 50 is in the off-state, in the second operation mode of performing the electric power conversion toward the first terminals 11 from the second terminals 12. At this time, in the rectifying circuit 5, the diode 51 functions as the second rectifier due to the on-state of the switching element 53, and accordingly, a current I2 (half-waves) from the first winding 21 (auxiliary winding 212) flows in the capacitor 52 to allow charge of the capacitor 52. Therefore, in the state of FIG. 2B, the voltage V1 across the first terminals 11 agrees with a voltage obtained by adding a voltage V12 across the capacitor 52 to a voltage V11 across the capacitor 45.

That is, in the second operation mode, the electric power conversion device 1 converts DC power received from the second terminals 12, and outputs, via the first terminals 11, the converted power as the voltage V1 (=V11+V12) obtained by adding an output voltage V12 of the rectifying circuit 5 to an output voltage V11 of the conversion circuit 4. For this reason, even if the output voltage V11 of the conversion circuit 4 and the output voltage V12 of the rectifying circuit 5 are lower than the voltage V2 across the second terminals 12, the electric power conversion device 1 can boost, in the second operation mode, the voltage V2 across the second terminals 12, and output the power as the voltage V1 across the first terminals 11 (V1>V2).

In the present embodiment, it is assumed that a ratio of the output voltage V11 of the conversion circuit 4 and the voltage V2 across the second terminals 12 is determined depending on the turn ratio (n1:m) of the main winding 211 and the second winding 22, and the output voltage V11 of the conversion circuit 4 is denoted by "V2×n1/m". In addition, similarly, it is assumed that a ratio of the output voltage V12 of the rectifying circuit 5 and the voltage V2 across the second terminals 12 is determined depending on the turn ratio (n2:m) of the auxiliary winding 212 and the second winding 22, and the output voltage V12 of the rectifying circuit 5 is denoted by "V2×n2/m". That is, it is assumed that a ratio "V11:V12" of the voltage V11 across the capacitor 45 and the voltage V12 across the capacitor 52 is denoted by "n1:n2".

In this case, if the number of turns "n1" of the main winding 211, the number of turns "n2" of the auxiliary winding 212 and the number of turns "m" of the second winding 22 satisfy a relationship of "n1+n2>m", the sum of the output voltage V11 of the conversion circuit 4 and the output voltage V12 of the rectifying circuit 5 is higher than the voltage V2 across the second terminals 12. In short, in the second operation mode, the electric power conversion device 1 boosts the voltage V2 across the second terminals 12, and outputs the power as the voltage V1 (=V2×n1/m+V2×n2/m) across the first terminals 11 (V1>V2).

Note that, in the second operation mode, because the conversion circuit 4 performs full-wave rectification and in contrast the rectifying circuit 5 performs half-wave rectification, the output voltage V11 of the conversion circuit 4 and the output voltage V12 of the rectifying circuit 5 are not necessarily denoted by "V2×n1/m" and "V2×n2/m" as described above, respectively. However, it is possible to set the output voltage V12 of the rectifying circuit 5 to "V2×n2/m" by, for example, adjusting capacitances of the capacitor 45 of the conversion circuit 4 and the capacitor 52 of the rectifying circuit 5 or using the rectifying circuit 5 as a full-wave rectification circuit.

According to the electric power conversion device 1 of the present embodiment as described above, the switching section 50 is configured to switch the connection state of the rectifying circuit 5 with respect to the first terminals 11, based on the first operation mode or the second operation mode, and therefore, it is possible to perform bidirectionally boosting of electric power. That is, the first conversion part 31 is configured to, in the first operation mode, supply DC power received from the first terminals 11 into the second conversion part 32 through the conversion circuit 4 and the transformer 2, and is configured to, in the second operation mode, output to the first terminals 11 the voltage obtained by adding the output voltage of the rectifying circuit 5 to the output voltage of the conversion circuit 4. Therefore, the electric power conversion device 1 can perform boosting of electric power in both of the electric power conversion (first operation mode) toward the second terminals 12 from the first terminals 11, and the electric power conversion (second operation mode) toward the first terminals 11 from the second terminals 12.

During discharge of the storage battery (in the first operation mode), the electric power conversion device 1 can boost DC power, which is supplied from the vehicle side (the storage battery) into the first terminals 11, and output the boosted power to the house side (the DC supply bus) via the second terminal 12. On the other hand, during charge of the storage battery (in the second operation mode), the electric power conversion device 1 can boost DC power, which is supplied from the house side (the DC supply bus) into the second terminals 12, and output the boosted power to the vehicle side (the storage battery) via the first terminals 11.

As one example, described will be operation of the electric power conversion device 1 when an input/output voltage range on the vehicle side is a range of DC 100V to 500V and an input/output voltage range on the house side is a range of DC 300V to 400V. In this case, during discharge of the storage battery, the electric power conversion device 1 boosts DC 100V, which is input to the first terminals 11, to DC 300V, and outputs the DC 300V via the second terminals 12. During charge of the storage battery, the electric power conversion device 1 boosts DC 300V, which is input to the second terminals 12, to DC 500V, and outputs the DC 500V via the first terminals 11. Note that, in the electric power conversion device 1, the first terminals 11 may be connected with the house side, and the second terminals 12 may be connected with the vehicle side. In addition, the input/output voltage ranges on the vehicle and house sides are not limited to the above values.

Figure 3:
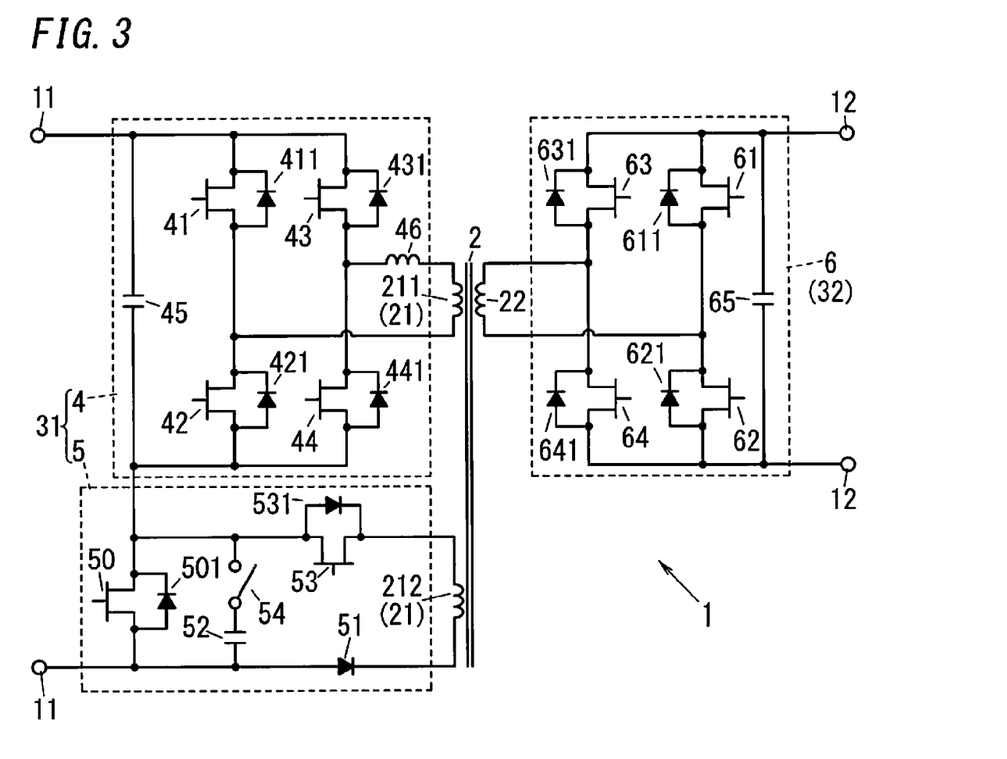
FIG. 3 is a circuit diagram illustrating a configuration of a variation according to the First Embodiment.

Incidentally, as a variation of the present embodiment, the rectifying circuit 5 of the electric power conversion device 1 may further include a (first) switch 54 that is between the (second) capacitor 52 and the switching section 50, as shown in FIG. 3. In the example of FIG. 3, the switch 54 is between the capacitor 52, and a connecting point of the switching section 50 and the switching element 53, and on/off switching of the switch 54 can be controlled by the control unit.

Figure 4:
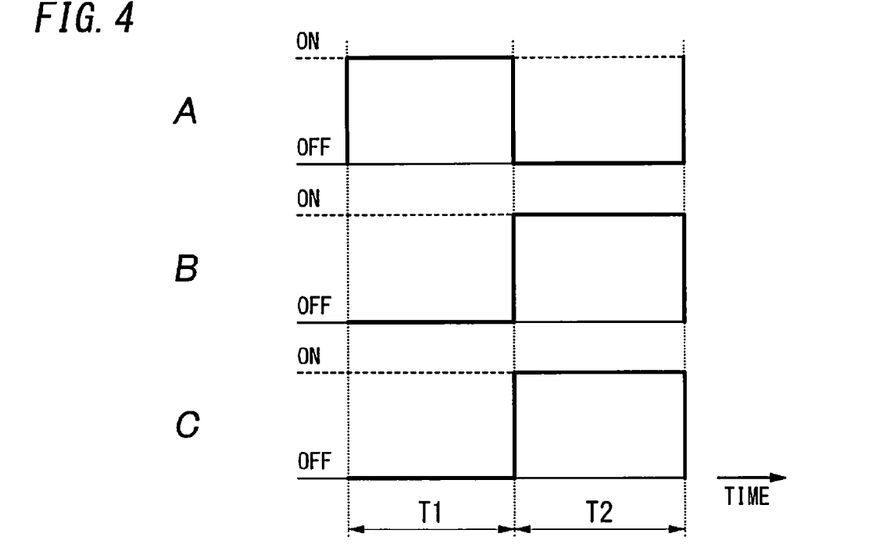
FIG. 4 is an explanatory drawing for operation of the variation according to the First Embodiment.

Timing charts A to C of FIG. 4 respectively show operations of the switching section 50, the switching element 53 and the switch 54 in the example of FIG. 3. That is, the timing chart A of FIG. 4 shows on/off states of the switching section 50, and the timing chart B of FIG. 4 shows on/off states of the switching element 53, and the timing chart C of FIG. 4 shows on/off states of the switch 54.

As shown in the timing charts A to C of FIG. 4, the rectifying circuit 5 is configured to turn off the switch 54 so that the capacitor 52 is electrically separated from the switching section 50, in the first operation mode (during a time period T1) in which the switching section 50 is in the on-state and the switching element 53 is in the off-state. As shown in the timing charts A to C of FIG. 4, the rectifying circuit 5 is configured to turn on the switch 54 so that the capacitor 52 is in a connection state with respect to the first terminals 11 to output a voltage across the capacitor 52 to the first terminals 11, in the second operation mode (during a time period T2) in which the switching section 50 is in the off-state and the switching element 53 is in the on-state.

According to the electric power conversion device 1 in FIG. 3 as described above, when the operation mode is switched from the second operation mode to the first operation mode, the switch 54 is turned off at the same timing of when the switching section 50 is turned on, and accordingly, it is possible to prevent a discharge current of the capacitor 52 from flowing through the switching section 50. Therefore, the electric power conversion device 1 can prevent stress to circuit elements caused by a large current flowing through the switching section 50 from the capacitor 52.

Figure 5:
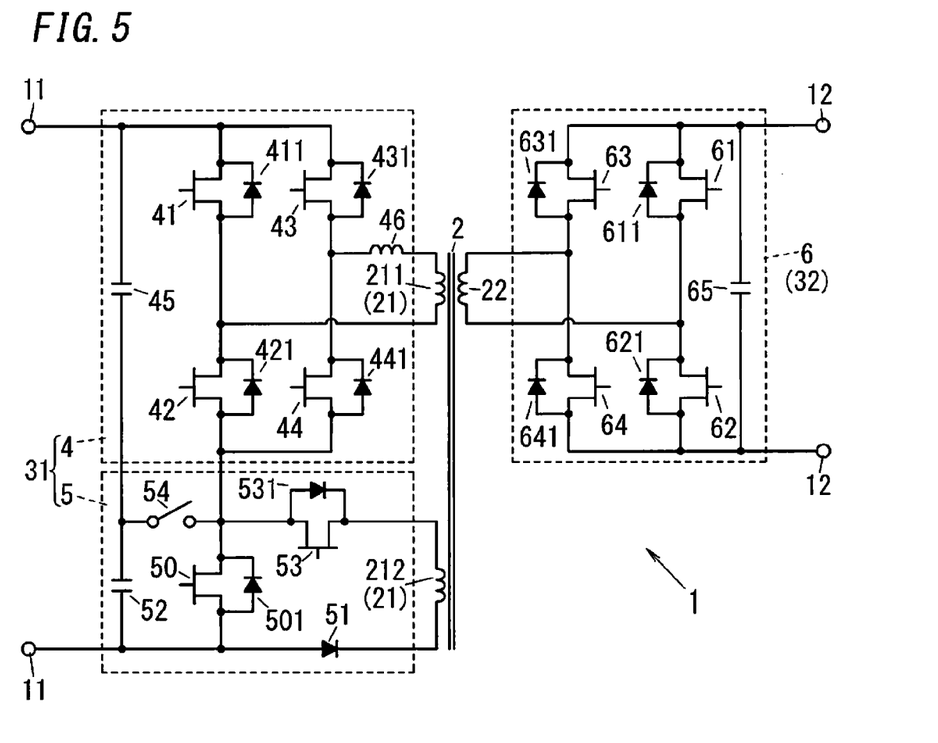
FIG. 5 is a circuit diagram illustrating a configuration of another variation according to the First Embodiment.

The switch 54 of electrically separating the capacitor 52 from the switching section 50 may be provided at a location as shown in FIG. 5. In the example of FIG. 5, the electric power conversion device 1 includes the switch 54 between a connecting point of the capacitor 45 and the capacitor 52, and a connecting point of the switching element 42 and the switching section 50. In this configuration, the rectifying circuit 5 is configured to turn off the switch 54 so that the capacitor 52 is electrically separated from the switching section 50, in the first operation mode in which the switching section 50 is in the on-state and the switching element 53 is in the off-state. The rectifying circuit 5 is configured to turn on the switch 54 so that the capacitor 52 is in a connection state with respect to the switching element 53 to allow charge of the capacitor 52 with the power supplied from the auxiliary winding 212, in the second operation mode in which the switching section 50 is in the off-state and the switching element 53 is in the on-state.

Here, it is preferred that when the electric power conversion device 1 includes the above-mentioned switch 54 in the rectifying circuit 5, the (first) and (second) capacitors 45 and 52 have capacitances, depending on a turn ratio (n1:n2) of the main winding 211 and the auxiliary winding 212. In the example of FIG. 5, it is assumed that the turn ratio "n1:n2" of the main winding 211 and the auxiliary winding 212 is "3:1", and in the second operation mode, a voltage across the capacitor 45 is 300V and a voltage across the capacitor 52 is 100V, for example. In this case, a ratio "C1:C2" of a capacitance C1 of the capacitor 45 and a capacitance C2 of the capacitor 52 is preferably "1:3". That is, the capacitances are determined depending the turn ratio (n1:n2) of the main winding 211 and the auxiliary winding 212 so that electric charge amounts in the capacitors 45 and 52 are equal to each other in the second operation mode.

When the capacitances of the capacitors 45 and 52 are determined depending on the turn ratio of the main winding 211 and the auxiliary winding 212, upon on/off switching of the switch 54, the output voltage of the conversion circuit 4 agrees with the voltage across the capacitor 45 and the output voltage of the rectifying circuit 5 agrees with the voltage across the capacitor 52. Therefore, upon on/off switching of the switch 54, the electric power conversion device 1 can prevent unnecessary charge and discharge of the capacitors 45 and 52.

Note that, specific components of the conversion circuit 4 and the rectifying circuit 5 in the first conversion part 31 and the conversion circuit 6 in the second conversion part 32 described in the present embodiment are not limited to the above-mentioned components, and may be appropriately modified. For example, the rectifying circuit 5 may be a full-wave rectification circuit with a diode bridge, instead of the half-wave rectification circuit as described above. In the second operation mode in which the conversion circuit 4 functions as a rectifying circuit, the conversion circuit 4 may be configured to perform the rectification, for example, by switching operation of the switching elements 41 to 44, instead of a configuration of turning off all of the switching elements 41 to 44 to perform the rectification with the diode bridge. That is, the conversion circuit 4 may convert AC power received from the main winding 211 into DC power and apply the DC power to the capacitor 45, by switching operation such that the set of the switching elements 41 and 44, and the set of the switching elements 42 and 43 are alternately turned on. The conversion circuit 6 is also similar.

The transformer 2 is not limited to a configuration that the first winding 21 includes two windings: the main winding 211 and the auxiliary winding 212. The first winding 21 may include a single winding. In this case, the first conversion part 31 is configured by the conversion circuit 4 and the rectifying circuit 5 being connected in parallel with each other between both ends of the first winding 21.

The transformer 2 may include, as a core, a first core at which the first winding 21 is provided and a second core at which the second winding 22 is provided, and accordingly, be configured to be capable of dividing the first winding 21 and the second winding 22. In this case, the first and second conversion parts 31 and 32 of the electric power conversion device 1 can be physically separated from each other, and therefore, it is possible to magnetically couple the cores of the transformer 2 to each other so that, only upon discharge or charge of the storage battery, the electric power conversion device 1 is in a state of being capable of supplying/receiving electric power between the first and second conversion parts 31 and 32.

Second Embodiment

An electric power conversion device 1 of the present embodiment is different from that of the First Embodiment in that a conversion circuit 4 and a rectifying circuit 5 of a first conversion part 31 are connected with first terminals 11 so that, in a second operation mode, ripples (pulsating voltages) generated in output voltages are inverse with respect to each other. Hereinafter, constituent elements similar to those of the First Embodiment are assigned with same reference numerals, and the explanations thereof are appropriately omitted.

Figure 6:
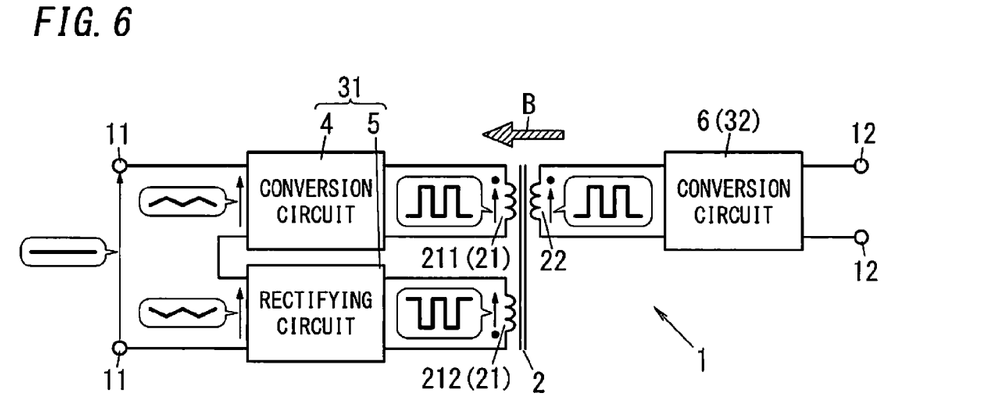
FIG. 6 is a block diagram illustrating a configuration of an electric power conversion device according to Second Embodiment.

That is, the rectifying circuit 5 and the conversion circuit 4 are connected with first terminals 11 so that, in the second operation mode, a ripple generated in an output voltage of the rectifying circuit 5 has an inverse phase with respect to a phase of a ripple generated in an output voltage of the conversion circuit 4. In the present embodiment, as shown in FIG. 6, the electric power conversion device 1 is configured so that winding directions of a main winding 211 and an auxiliary winding 212 of a transformer 2 are reverse with respect to each other. Here, the conversion circuit 4, which is connected with the main winding 211 is configured to, in the second operation mode, perform half-wave rectification, similarly to the rectifying circuit 5. Note that, in FIG. 6, an arrow B denotes a direction toward which the electric power conversion is performed, and a voltage waveform in each circuit is illustrated.

According to the electric power conversion device 1 of the present embodiment described above, in the second operation mode, because a ripple component superposed on the output voltage of the conversion circuit 4 has an inverse phase with respect to a phase of a ripple component superposed on the output voltage of the rectifying circuit 5, those ripple components are offset. Therefore, the electric power conversion device 1 can output a DC voltage with less ripple components via the first terminals 11 in the second operation mode, while capacitors 45 and 52 (see FIG. 1) of the conversion circuit 4 and the rectifying circuit 5 have relatively-small capacitances. As a result, that leads to downsizing of the capacitors 45 and 52 and a reduction in the cost.

Note that, for making the phases of the ripples generated in the output voltages of the conversion circuit 4 and the rectifying circuit 5, which are inverse with respect to each other, the present embodiment is not limited to the above-mentioned configuration that the winding directions of the main winding 211 and the auxiliary winding 212 are reverse with respect to each other. For example, the conversion circuit 4 may be configured to perform half-wave rectification to AC power received from the main winding 211 by switching operation of switching elements 41 to 44 so that an output to the first terminals 11 has an inverse phase with respect to that of the rectifying circuit 5.

Other configurations and functions are similar to those of the First Embodiment. Note that, configurations of the Second Embodiment may be adopted by being appropriately combined with each configuration described in the First Embodiment.

Third Embodiment

Figure 7:
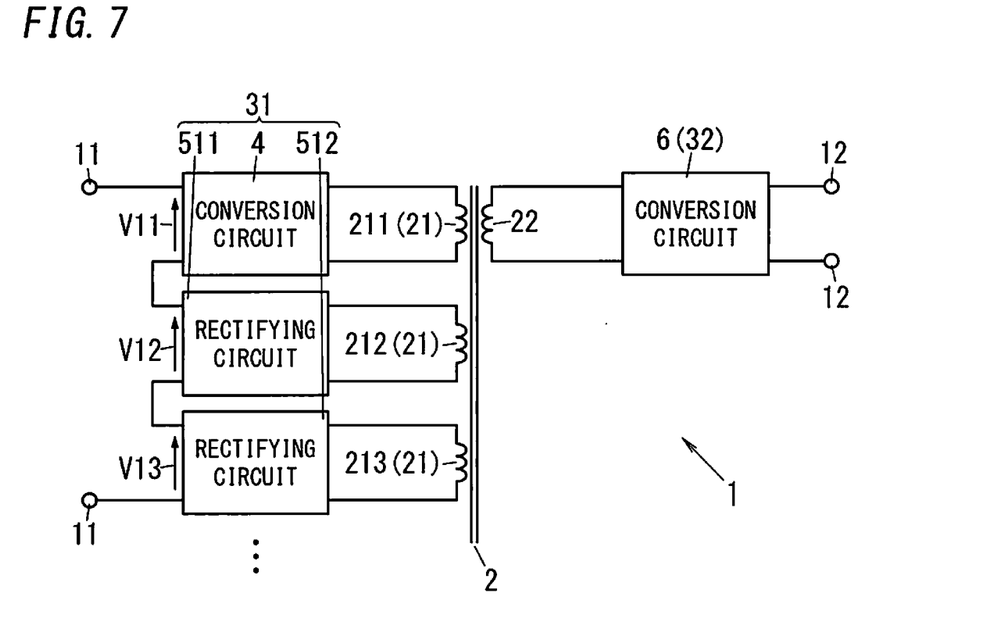
FIG. 7 is a block diagram illustrating a configuration of an electric power conversion device according to Third Embodiment.

As shown in FIG. 7, an electric power conversion device 1 of the present embodiment is different from that of the First Embodiment in that a first conversion part 31 includes a plurality of rectifying circuits 511, 512, . . . . Hereinafter, constituent elements similar to those of the First Embodiment are assigned with same reference numerals, and the explanations thereof are appropriately omitted.

A plurality of switching sections 50 (regarding one section, see FIG. 1) are respectively configured to switch connection states of the plurality of rectifying circuits 511, 512, . . . with respect to first terminals 11, based on a first operation mode and a second operation mode. Accordingly, the first conversion part 31 is configured to, in the second operation mode, output to the first terminals 11 a voltage obtained by adding an output voltage of at least one of the plurality of rectifying circuits 511, 512, . . . to an output voltage of a conversion circuit 4.

That is, each of the plurality of switching sections 50 is connected between both ends of a capacitor 52 (see FIG. 1) in a corresponding rectifying circuit, of the plurality of rectifying circuits 511, 512, . . . . In the first operation mode, the plurality of switching sections 50 are operated to cause short-circuiting between both ends of capacitors 52 in all of the plurality of rectifying circuits 511, 512, . . . . On the other hand, in the second operation mode, at least one of the plurality of switching sections 50 is turned off to output to the first terminals 11 a voltage obtained by adding at least one of output voltages V12, V13, . . . of the plurality of rectifying circuits 511, 512, . . . to a voltage V11 between both ends of the conversion circuit 4.

According to the electric power conversion device 1 of the present embodiment described above, the plurality of rectifying circuits 511, 512, . . . are connected with the conversion circuit 4 in multiple stages. Therefore, it is possible to change, in multiple stages, an output voltage from the first terminals 11 in the second operation mode.

Other configurations and functions are similar to those of the First Embodiment. Note that, configurations of the Third Embodiment may be adopted by being appropriately combined with each configuration described in the First and Second Embodiments.

Fourth Embodiment

Figure 8:
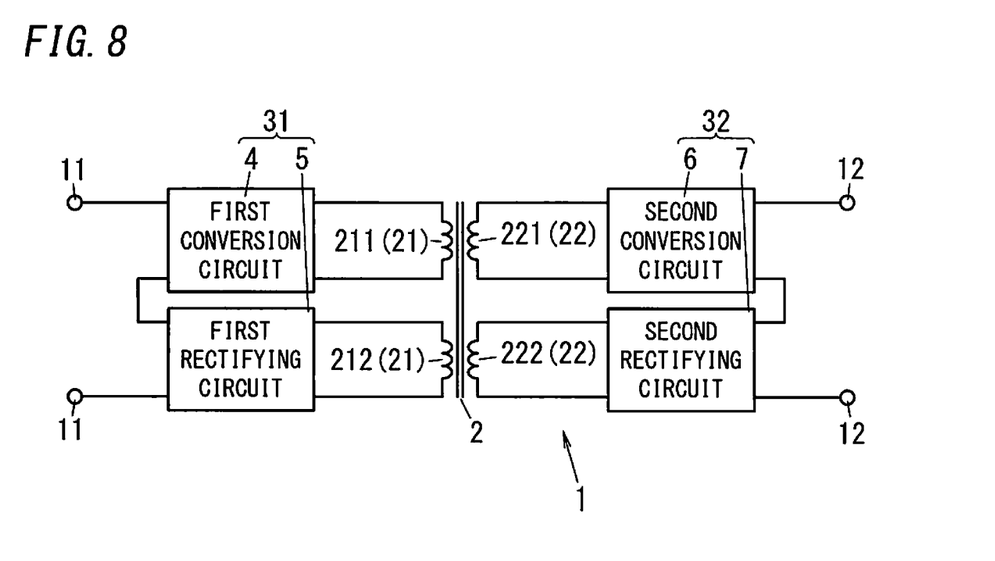
FIG. 8 is a block diagram illustrating a configuration of an electric power conversion device according to Fourth Embodiment.

As shown in FIG. 8, an electric power conversion device 1 of the present embodiment is different from that of the First Embodiment in that a second conversion part 32 is configured to be symmetrical with a first conversion part 31 around a transformer 2. Hereinafter, constituent elements similar to those of the First Embodiment are assigned with same reference numerals, and the explanations thereof are appropriately omitted.

In the present embodiment, the transformer 2 is provided on a secondary side thereof (a side of second terminals 12) with, as a second winding 22, two windings: a (second) main winding 221 and a (second) auxiliary winding 222. The second conversion part 32 includes a (second) rectifying circuit 7 and a second switching section (not shown), in addition to a (second) conversion circuit 6 connected with the main winding 221. The rectifying circuit 7 is connected with the auxiliary winding 222. The second switching section is configured to switch a connection state of the rectifying circuit 7 with respect to the second terminals 12.

The conversion circuit 6 is configured to bidirectionally convert electric power between the second terminals 12 and the second winding 22 (main winding 221). The rectifying circuit 7 is configured to receive power supply from the second winding 22 (auxiliary winding 222), and output DC power. In the example of FIG. 8, the second switching section is provided in rectifying circuit 7. However, the second switching section may be provided separately from the rectifying circuit 7. If the second terminals 12 are replaced with the first terminals 11 and the second winding 22 is replaced with the first winding 21, the conversion circuit 6 in the second conversion part 32 is similar to a conversion circuit 4 in the first conversion part 31 and the rectifying circuit 7 in the second conversion part 32 is similar to a rectifying circuit 5 in the first conversion part 31.

That is, the conversion circuit 6 includes a third rectifier (not shown) connected with the main winding 221, and a third capacitor (not shown) connected with a DC output of the third rectifier. The rectifying circuit 7 includes a fourth rectifier (not shown) connected with the auxiliary winding 222, and a fourth capacitor (not shown) connected with a DC output of the fourth rectifier. The third capacitor is connected in series with the fourth capacitor, and a set of the third and fourth capacitors is connected to the second terminals 12.

The third rectifier is similar to a first rectifier (diodes 411, 421, 431 and 441 in FIG. 1) of the conversion circuit 4, and the third capacitor is similar to a (first) capacitor 45 of the conversion circuit 4. The fourth rectifier is similar to a second rectifier (a diode 51 in FIG. 1) of the rectifying circuit 5, and the fourth capacitor is similar to a (second) capacitor 52 of the rectifying circuit 5. For this reason, regarding constituent elements of the conversion circuit 6 and the rectifying circuit 7, illustrations and detailed explanations thereof are omitted here.

The second switching section is similar to a (first) switching section 50 in the first conversion part 31. That is, the second switching section is a switching element that is connected between both ends of the fourth capacitor.

The second switching section is configured to, in the second operation mode, be turned on to cause short-circuiting between both ends of the fourth capacitor of the rectifying circuit 7, and, in the first operation mode, be turned off. That is, the second switching section is configured to switch the connection state of the rectifying circuit 7 with respect to the second terminals 12, based on the first operation mode or the second operation mode. Accordingly, the second conversion part 32 is configured to, in the second operation mode, supply DC power received from the second terminals 12 into the first conversion part 31 through the conversion circuit 6 and the transformer 2, and in the first operation mode, output to the second terminals 12 a voltage obtained by adding an output voltage of the rectifying circuit 7 to an output voltage of the conversion circuit 6.

According to the electric power conversion device 1 of the present embodiment described above, it is possible to make bidirectional boosting ratios between the first terminals 11 and second terminals 12 agree with each other by, for example, setting a turn ratio of the first winding 21 and the second winding 22 as "1:1".

Incidentally, as a variation of the present embodiment, the rectifying circuit 7 of the electric power conversion device 1 may further include a second switch (not shown) that is between the fourth capacitor and the second switching section. The second switch is similar to the switch 54 as the variation of the First Embodiment shown in FIG. 3. For this reason, an illustration and a detailed explanation of the second switch are omitted here. When the rectifying circuit 7 includes the second switch, capacitances of the third and fourth capacitors may be determined depending a turn ratio of the main winding 221 and the auxiliary winding 222 so that electric charge amounts in the third and fourth capacitors are equal to each other in the first operation mode.

Other configurations and functions are similar to those of the First Embodiment.

Note that, the configuration of the Fourth Embodiment (that the second conversion part 32 is configured to be symmetrical with the first conversion part 31) may be adopted by being appropriately combined with each configuration described in the First Embodiment, or each configuration described in the Second and Third Embodiments.

For example, when the configuration of the Fourth Embodiment is combined with the configuration of the Second Embodiment, the conversion circuit 6 and the rectifying circuit 7 in the second conversion part 32 are connected with the second terminals 12 so that, in the first operation mode, ripples (pulsating voltages) generated in output voltages are inverse with respect to each other. When the configuration of the Fourth Embodiment is combined with the configuration of the Third Embodiment, the second conversion part 32 includes a plurality of second rectifying circuits. In this case, a plurality of second switching sections are respectively configured to switch connection states of the plurality of second rectifying circuits with respect to the second terminals 12, based on the first operation mode or the second operation mode. Accordingly, the second conversion part 32 is configured to, in the first operation mode, output to the second terminals 12 a voltage obtained by adding an output voltage of at least one of the plurality of second rectifying circuits to an output voltage of the conversion circuit 6.

In each of the above-mentioned embodiments, as one example, described is the electric power conversion device 1, which is used for charge and discharge of a storage battery equipped in a vehicle. However, the electric power conversion device 1 may be used for purposes other than charge and discharge of a storage battery.

The invention claimed is:

1. An electric power conversion device, comprising:
a transformer that is disposed between a first terminal and a second terminal;
a first conversion part that is disposed between the first terminal and a first winding of the transformer; and
a second conversion part that is disposed between the second terminal and a second winding of the transformer;
wherein the electric power conversion device has a first operation mode and a second operation mode,
the first operation mode being of converting DC power received from the first terminal into DC power having a desired voltage to be output to the second terminal,
the second operation mode being of converting DC power received from the second terminal into DC power having a desired voltage to be output to the first terminal,
wherein the first conversion part comprises:
a first conversion circuit that is configured to bidirectionally convert power between the first terminal and the first winding;
at least one first rectifying circuit that is configured to output DC power by receiving power supply from the first winding; and
at least one first switching section that is configured to switch a connection state of the first rectifying circuit with respect to the first terminal, based on the first operation mode or the second operation mode, and
wherein, by the first switching section switching the connection state of the first rectifying circuit, the first conversion part is configured to:
in the first operation mode, supply the DC power received from the first terminal into the second conversion part through the first conversion circuit and the transformer; and
in the second operation mode, output to the first terminal a voltage obtained by adding an output voltage of the first rectifying circuit to an output voltage of the first conversion circuit,
wherein the transformer comprises, as the first winding, a first main winding that is connected with the first conversion circuit, and a first auxiliary winding that is connected with the first rectifying circuit,
wherein the first conversion circuit comprises a first rectifier that is connected with the first main winding, and a first capacitor that is connected with a DC output of the first rectifier,
wherein the first rectifying circuit comprises a second rectifier that is connected with the first auxiliary winding, and a second capacitor that is connected with a DC output of the second rectifier,
wherein the first capacitor is connected in series with the second capacitor, a set of the first and second capacitors being connected to the first terminal, and
wherein the first switching section is a switching element that is connected between both ends of the second capacitor,
the first switching section being configured to, in the first operation mode, be turned on to cause short-circuiting between the both ends of the second capacitor, and, in the second operation mode, be turned off.

2. The electric power conversion device according to claim 1,
wherein the first rectifying circuit further comprises a first switch that is between the second capacitor and the first switching section,
the first rectifying circuit being configured to, in the first operation mode, turn off the first switch, and, in the second operation mode, turn on the first switch.

3. The electric power conversion device according to claim 2, wherein the first and second capacitors have capacitances, depending on a turn ratio of the first main winding and the first auxiliary winding, so that electric charge amounts in the first and second capacitors are equal to each other in the second operation mode.

4. The electric power conversion device according to claim 1, wherein the first rectifying circuit and the first conversion circuit are connected with the first terminal so that, in the second operation mode, a ripple generated in the output voltage of the first rectifying circuit has an inverse phase with respect to a phase of a ripple generated in the output voltage of the first conversion circuit.

5. The electric power conversion device according to claim 1,
wherein the at least one first rectifying circuit of the first conversion part comprises a plurality of first rectifying circuits, the at least one first switching section comprising a plurality of first switching sections, and
wherein, by the plurality of first switching sections respectively switching connection states of the plurality of first rectifying circuits with respect to the first terminal, the first conversion part is configured to, in the second operation mode, output to the first terminal a voltage obtained by adding an output voltage of at least one of the plurality of first rectifying circuits to the output voltage of the first conversion circuit.

6. The electric power conversion device according to claim 1,
wherein the second conversion part comprises:
a second conversion circuit that is configured to bidirectionally convert power between the second terminal and the second winding;
at least one second rectifying circuit that is configured to output DC power by receiving power supply from the second winding; and
at least one second switching section that is configured to switch a connection state of the second rectifying circuit with respect to the second terminal, based on the first operation mode or the second operation mode, and
wherein, by the second switching section switching the connection state of the second rectifying circuit, the second conversion part is configured to:
in the second operation mode, supply the DC power received from the second terminal into the first conversion part through the second conversion circuit and the transformer; and
in the first operation mode, output to the second terminal a voltage obtained by adding an output voltage of the second rectifying circuit to an output voltage of the second conversion circuit.

7. The electric power conversion device according to claim 6, wherein the transformer comprises, as the second winding, a second main winding that is connected with the second conversion circuit, and a second auxiliary winding that is connected with the second rectifying circuit.

8. The electric power conversion device according to claim 7,
wherein the second conversion circuit comprises a third rectifier that is connected with the second main winding, and a third capacitor that is connected with a DC output of the third rectifier,
wherein the second rectifying circuit comprises a fourth rectifier that is connected with the second auxiliary winding, and a fourth capacitor that is connected with a DC output of the fourth rectifier,
wherein the third capacitor is connected in series with the fourth capacitor, a set of the third and fourth capacitors being connected to the second terminal, and
wherein the second switching section is a switching element that is connected between both ends of the fourth capacitor,
the second switching section being configured to, in the second operation mode, be turned on to cause short-circuiting between the both ends of the fourth capacitor, and, in the first operation mode, be turned off.

9. The electric power conversion device according to claim 8,
wherein the second rectifying circuit further comprises a second switch that is between the fourth capacitor and the second switching section,
the second rectifying circuit being configured to, in the second operation mode, turn off the second switch, and, in the first operation mode, turn on the second switch.

10. The electric power conversion device according to claim 9, wherein the third and fourth capacitors have capacitances, depending on a turn ratio of the second main winding and the second auxiliary winding, so that electric charge amounts in the third and fourth capacitors are equal to each other in the first operation mode.

11. The electric power conversion device according to claim 6, wherein the second rectifying circuit and the second conversion circuit are connected with the second terminal so that, in the first operation mode, a ripple generated in the output voltage of the second rectifying circuit has an inverse phase with respect to a phase of a ripple generated in the output voltage of the second conversion circuit.

12. The electric power conversion device according to claim 6,
wherein the at least one second rectifying circuit of the second conversion part comprises a plurality of second rectifying circuits, the at least one second switching section comprising a plurality of second switching sections, and
wherein, by the plurality of second switching sections respectively switching connection states of the plurality of second rectifying circuits with respect to the second terminal, the second conversion part is configured to, in the first operation mode, output to the second terminal a voltage obtained by adding an output voltage of at least one of the plurality of second rectifying circuits to the output voltage of the second conversion circuit.

* * * * *